(12) United States Patent
Meunier et al.

(10) Patent No.: US 10,358,028 B2
(45) Date of Patent: Jul. 23, 2019

(54) AIR-COOLED ELECTRIC PROPULSION UNIT

(71) Applicant: RENAULT s.a.s., Boulogne Billancourt (FR)

(72) Inventors: Fabrice Meunier, Boulogne Billancourt (FR); Bruno Chalmette, Suresnes (FR)

(73) Assignee: RENAULT s.a.s., Boulogne Billancourt (FR)

( * ) Notice: Subject to any disclaimer, the term of this patent is extended or adjusted under 35 U.S.C. 154(b) by 279 days.

(21) Appl. No.: 15/518,938

(22) PCT Filed: Sep. 25, 2015

(86) PCT No.: PCT/FR2015/052562
§ 371 (c)(1),
(2) Date: Apr. 13, 2017

(87) PCT Pub. No.: WO2016/092162
PCT Pub. Date: Jun. 16, 2016

(65) Prior Publication Data
US 2017/0225559 A1    Aug. 10, 2017

(30) Foreign Application Priority Data

Dec. 8, 2014 (FR) .................................. 14 62016

(51) Int. Cl.
*H02K 5/20* (2006.01)
*H02K 9/04* (2006.01)
(Continued)

(52) U.S. Cl.
CPC ................ *B60K 11/06* (2013.01); *B60K 1/00* (2013.01); *H02K 5/20* (2013.01); *H02K 9/04* (2013.01);
(Continued)

(58) Field of Classification Search
CPC .. H02K 5/00; H02K 5/20; H02K 9/00; H02K 9/04; H02K 9/06; B60K 1/00; B60K 11/00; B60K 11/02; B60K 11/06
See application file for complete search history.

(56) References Cited

U.S. PATENT DOCUMENTS

| | | | | |
|---|---|---|---|---|
| 3,670,190 A | * | 6/1972 | Goebel | ............... H02K 9/06 310/60 R |
| 3,714,795 A | * | 2/1973 | Fowell | ............... F24F 1/10 62/181 |

(Continued)

FOREIGN PATENT DOCUMENTS

| | | |
|---|---|---|
| DE | 10 2010 040 491 A1 | 3/2012 |
| EP | 0 416 468 A1 | 3/1991 |
| FR | 3 000 180 A3 | 6/2014 |

OTHER PUBLICATIONS

International Search Report dated Dec. 23, 2015 in PCT/FR2015/052562 Filed Sep. 25, 2015.
(Continued)

*Primary Examiner* — Tran N Nguyen
(74) *Attorney, Agent, or Firm* — Oblon, McClelland, Maier & Neustadt, L.L.P.

(57) ABSTRACT

An electric powertrain includes a speed reducer and an electric motor housed in contiguous casings, together with an air cooling circuit for the speed reducer and the electric motor. The cooling circuit includes an opening for the inlet of air into the casing of the speed reducer, openings for the passage of air in a casing wall separating the speed reducer from the electric motor, and an air outlet opening in the casing of the electric motor. The cooling circuit also includes a fan placed at a height relative to the speed reducer and the electric motor, an upstream conduit that channels the air (Continued)

Figure 1:
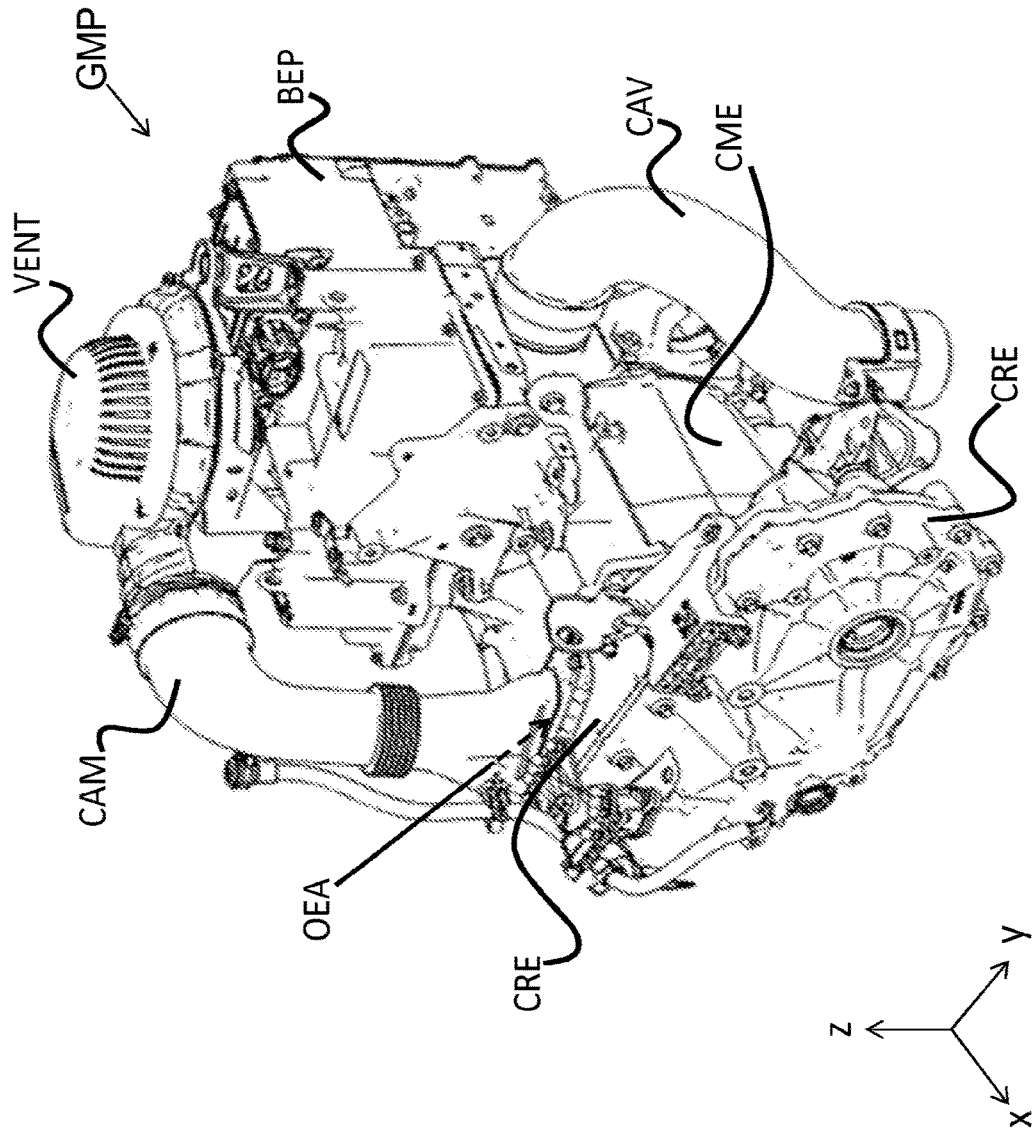

from the fan toward the speed reducer, and a downstream conduit for the outlet of the air from the electric motor toward the ground.

6 Claims, 3 Drawing Sheets

(51) Int. Cl.
  *B60K 11/06* (2006.01)
  *B60K 1/00* (2006.01)
  *H02K 9/06* (2006.01)
(52) U.S. Cl.
  CPC .......... *H02K 9/06* (2013.01); *B60K 2001/006* (2013.01)

(56) References Cited

U.S. PATENT DOCUMENTS

2013/0076174 A1* 3/2013 Wibben .................... H02K 9/14
  310/64
2013/0118820 A1* 5/2013 Yokoyama ......... B60H 1/00385
  180/65.1

OTHER PUBLICATIONS

French Search Report dated Jul. 23, 2015 in French Application No. 1462016 Filed Dec. 8, 2014.

\* cited by examiner

AIR-COOLED ELECTRIC PROPULSION UNIT

The present invention relates in a general way to the fields of electrical engineering and motor vehicles, and more specifically to the cooling of an electric traction motor of an electric or hybrid vehicle.

In an electric vehicle in which the electric traction motor needs to be cooled, an air cooling system may be used, the air which has served to cool the motor having to be discharged from the vehicle through an outlet conduit. This outlet conduit usually discharges into the open air in the lower part of the vehicle, running the risk of being obstructed. For this reason, French patent FR2983433 proposes a protective device for the outlet conduit of such a vehicle.

However, such a protective device is insufficient. This is because the cooling system of a vehicle of this type comprises a fan integrated with the electric motor, that is to say sharing the rotor shaft of the electric motor. The reliability of this fan is at risk, because the fan draws in dust and splashes of water from the air outlet conduit of the cooling system. Furthermore, it has been found that the air cooling of such a cooling system loses efficiency owing to the pressure drops due, notably, to the complexity of the air circuit for cooling the electric motor of the vehicle.

On the other hand, prior art electric powertrains have large overall dimensions in the direction of the axis of rotation of the electric motor, notably because of the overall dimensions of the motor cooling system. Such a powertrain therefore tends to be extended forward into the front of the compartment of the vehicle, and to be vulnerable in case of frontal impact.

One object of the invention is to overcome at least some of the drawbacks of the prior art by providing a compact electric powertrain which is efficiently air-cooled, using, notably, a fan which is remote from the electric motor and is located at a height relative to the latter.

For this purpose, the invention proposes an electric powertrain comprising a speed reducer and an electric motor housed in contiguous casings, together with an air cooling circuit for said speed reducer and said electric motor, said cooling circuit comprising an opening for the inlet of air into the casing of the speed reducer, openings for the passage of air in a casing wall separating said speed reducer from said electric motor, and an air outlet opening in the casing of said electric motor, said powertrain being characterized in that said cooling circuit additionally comprises a fan placed at a height relative to said speed reducer and said electric motor, an upstream conduit channeling the air from said fan toward said speed reducer, and a downstream conduit for the outlet of the air from said electric motor toward the ground.

Because of the invention, the cooling circuit of the electric motor is subject to fewer pressure drops, owing to the placing of the cooling system fan at a height. By means of this configuration, the operation of the fan can be made more reliable, and it is thus possible to dispense with a protective device for the downstream air outlet conduit, thereby further reducing the pressure drops and simplifying the cooling system. Placing the fan at a height also makes it unnecessary to provide protection against dust and moisture for the fan. Furthermore, by joining together the casings of the speed reducer and the electric motor, which for this purpose are placed end to end with a common casing wall allowing air to pass through, and by positioning the fan externally relative to the electric motor, a transversely compact powertrain is obtained. The other elements of the powertrain, such as its power electronics, may be placed vertically relative to the speed reducer unit and the motor, thus reducing the vulnerability of the powertrain according to the invention in case of frontal impact.

According to an advantageous characteristic of the powertrain according to the invention, said fan being placed above the casing of said speed reducer or above the casing of said electric motor, said upstream conduit has no radius of curvature smaller than 75 mm (millimeters). Similarly, advantageously, said downstream conduit has no radius of curvature smaller than 38 mm.

This configuration of the upstream and/or downstream conduit minimizes the pressure drops in the air circuit of the cooling system.

According to another advantageous characteristic, said upstream conduit has a cross section which is enlarged in a transverse direction relative to said electric motor, and flattened in an axial direction of said electric motor, at the inlet to the casing of said speed reducer.

This characteristic further limits the pressure drops at the inlet of the speed reducer. This is because upstream and downstream conduits have a generally circular cross section, but, since the inlet of the speed reducer is narrow in the direction of the axis of rotation of the electric motor, this cross section is flattened at the inlet of the speed reducer in this axial direction. To avoid decelerating the air at the inlet of the speed reducer, therefore, this flattened cross section is enlarged in a transverse direction relative to the electric motor, orthogonal to said axial direction. This also provides better distribution of the air reaching the motor, thus improving the cooling of the motor.

According to yet another advantageous characteristic of the powertrain according to the invention, said air passage openings in said casing wall extend radially between, on the one hand, a support bearing of the rotor shaft of said electric motor, said bearing being present in said casing wall, and, on the other hand, the longitudinal walls of the casing of said electric motor, and extend angularly over a range from 15° to 25°, in a regular manner, on said casing wall.

This characteristic provides better cooling of the components of the electric motor, while maintaining good mechanical vibration resistance in the rotor.

Finally, advantageously, a downstream end part of said upstream conduit has a bellows to facilitate the positioning of said fan.

This bellows-shaped part of the upstream conduit enables the fan to be positioned in different ways, if required, according to the constraints on overall dimensions in the electric vehicle concerned.

Figure 2:
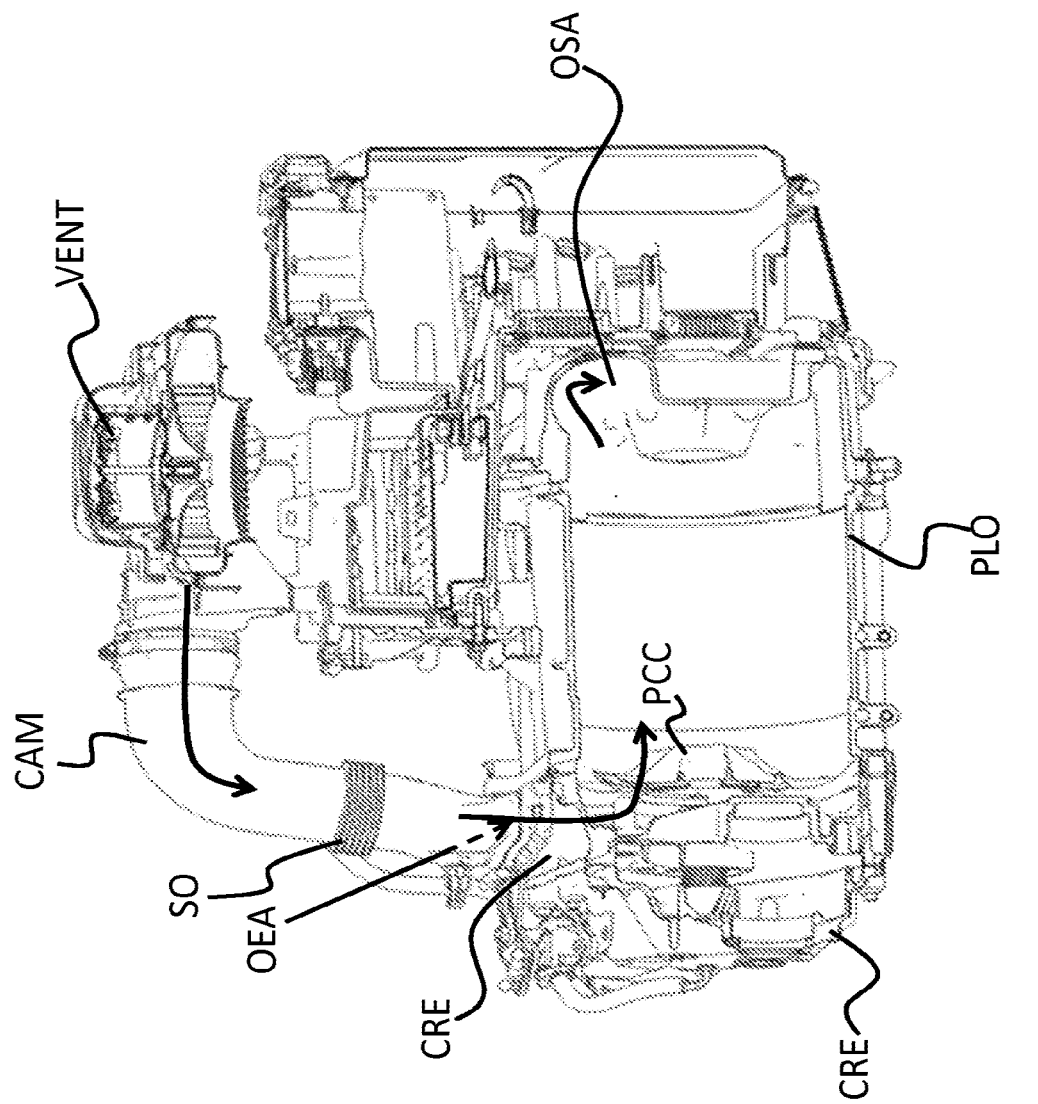
Figure 3:
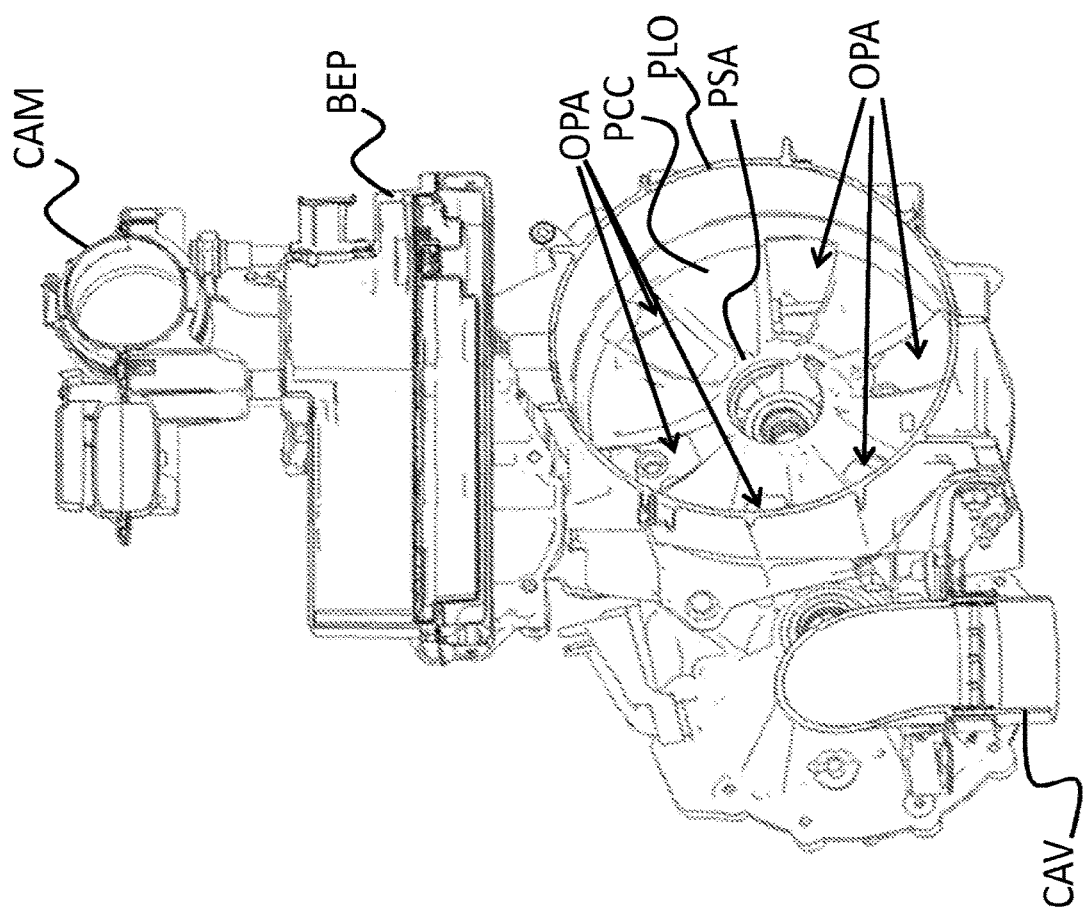

Other characteristics and advantages will be apparent from an examination of a preferred embodiment described with reference to the drawings, in which:

FIG. 1 shows an electric powertrain according to the invention, in this preferred embodiment, FIG. 2 shows a cross section taken through this electric powertrain, in an axial direction parallel to the axis of rotation of an electric motor of the powertrain, and FIG. 3 shows another cross section taken through this electric powertrain, in a transverse direction, orthogonal to the axis of rotation of the electric motor.

According to a preferred embodiment of the invention shown in FIG. 1, the electric powertrain GMP according to the invention comprises a speed reducer housed in a speed reducer casing CRE, an electric motor housed in a motor casing CME, housings for power electronics BEP, and an air cooling system.

The air cooling system comprises a fan VENT located at a height relative to the speed reducer and the electric motor, drawing in air from the outside. The term "height" is defined in this application with respect to the ground on which the vehicle comprising the powertrain GMP stands. The axis defining this height is the axis z in FIG. 1. The fan VENT must therefore be at a higher level than the motor and the speed reducer of the powertrain GMP, in order to facilitate the flow of air. In fact, in this embodiment of the invention, it is permissible for the fan VENT to have to overcome not more than 10 mbar (millibars) of air pressure in order to operate efficiently and provide the necessary flow rate (approximately 250 m$^3$ per hour) for cooling the motor.

The air cooling system also comprises an upstream conduit CAM which channels the air from the fan VENT toward the speed reducer, the air entering the latter through an air inlet opening OEA formed in the casing CRE of the speed reducer. The air entering the speed reducer then passes into the electric motor to cool it, and then flows out through an air outlet opening OSA formed at the end of the motor casing CME opposite the speed reducer. The air flows out in the lower part of the vehicle through a downstream air outlet conduit CAV which directs the air from the air outlet opening OSA toward the ground.

As shown in FIG. 1, the speed reducer casing CRE and the electric motor casing CME are contiguous, and the power electronics housings BEP are also integrated as much as possible into the powertrain GMP, so that the latter may be housed perpendicularly to the front-to-rear axis of a vehicle incorporating this electric powertrain GMP, in the motor compartment of the vehicle. Thus the electric powertrain GMP is extended in width in the engine compartment of the vehicle, and also in height, limiting its vulnerability to frontal impact.

The interface between the casing CRE of the speed reducer and the casing CME of the motor is shown more particularly in FIG. 2, which shows a cross section taken in the axial direction x, parallel to the axis of rotation of an electric motor of the powertrain, through the electric powertrain GMP. The speed reducer and the electric motor, which are not shown, are separated in their respective casings by a casing wall PCC separating the speed reducer from the electric motor. This casing wall PCC allows the air to flow as shown by the arrows in solid lines in FIG. 2, through air passage openings OPA present on the casing wall PCC and visible in FIG. 3, which shows a cross section taken in a transverse direction y, orthogonal to the axis of rotation of the electric motor, through the electric powertrain GMP.

To optimize the cooling of the electric motor while ensuring that the rotor of the electric motor has good vibration resistance, the casing wall PCC is convex toward the speed reducer, and the air passage openings OPA extend radially between a support bearing PSA of the rotor shaft, formed in the casing wall PCC, and the longitudinal walls PLO of the motor casing CME. The longitudinal walls PLO extend in the axial direction x and are substantially cylindrical. More precisely, the air passage openings OPA extend from the support bearing PSA to a peripheral part of the casing wall PCC very close to the longitudinal walls PLO; for example, this peripheral part is separated from the center of the rotor axis by a distance of between 80% and 100% of the distance between this center and the longitudinal walls PLO.

Additionally, the air passage openings OPA extend angularly over a range from 15° to 25°, and preferably over 20°, in a regular manner on the casing wall PCC.

To facilitate the air flow through the cooling circuit of the electric powertrain GMP, the upstream conduit CAM is configured so that it has no radius of curvature smaller than 75 mm. Preferably, the upstream conduit CAM has a radius of curvature which is always greater than 80 mm.

Similarly, the downstream conduit CAV has no radius of curvature smaller than 38 mm. Preferably, the downstream conduit CAV has a radius of curvature which is always greater than 40 mm.

Since the air inlet opening OEA of the speed reducer casing CRE is narrow in the direction x, the upstream conduit CAM has a cross section flattened in this direction x at its end which opens into the speed reducer casing CRE. To compensate for this axial constriction, this end of the upstream conduit CAM and the air inlet opening OEA have a transverse aperture in the direction y which is enlarged relative to the diameter of the cross section of the upstream conduit CAM at the other end of the conduit connected to the fan VENT.

Additionally, a bellows SO present in the downstream end part of the upstream conduit CAM provides a degree of flexibility in the positioning of the fan VENT on top of the power electronics housings BEP.

This is because, although the fan VENT, in this preferred embodiment of the invention, is positioned at a height relative to the electric motor, on the power electronics housings BEP, other embodiments of the invention would be feasible. In a variant, the fan VENT is positioned on the speed reducer, for example. In another variant embodiment of the invention, the upstream conduit has no bellows, or has differently shaped air passage openings OPA between the speed reducer and the electric motor.

The invention claimed is:

1. An electric powertrain, comprising:
   a speed reducer and an electric motor housed in contiguous casings, together with an air cooling circuit for said speed reducer and said electric motor, said cooling circuit comprising an opening for inlet of air into the casing of the speed reducer, openings for passage of air in a casing wall separating said speed reducer from said electric motor, and an air outlet opening in the casing of said electric motor,
   wherein said cooling circuit additionally comprises a fan placed at a height relative to said speed reducer and said electric motor, an upstream conduit that channels the air from said fan toward said speed reducer, and a downstream conduit for outlet of the air from said electric motor toward the ground.

2. The powertrain as claimed in claim 1, wherein said fan is placed above the casing of said speed reducer or above the casing of said electric motor, and said upstream conduit has no radius of curvature smaller than 75 mm.

3. The powertrain as claimed in claim 1, wherein said downstream conduit has no radius of curvature smaller than 38 mm.

4. The powertrain as claimed in claim 1, wherein said upstream conduit has a cross section which is enlarged in a transverse direction relative to said electric motor, and flattened in an axial direction of said electric motor, at the inlet to the casing of said speed reducer.

5. The powertrain as claimed in claim 1, wherein said air passage openings in said casing wall extend radially between a support bearing of a rotor shaft of said electric motor, said bearing being present in said casing wall, and longitudinal walls of the casing of said electric motor, and extend angularly over a range from 15° to 25°, in a regular manner, on said casing wall.

6. The powertrain as claimed in claim 1, wherein a downstream end part of said upstream conduit has a bellows to facilitate positioning of said fan.

* * * * *